(12) United States Patent
Gassoway

(10) Patent No.: US 8,149,723 B2
(45) Date of Patent: Apr. 3, 2012

(54) SYSTEMS AND METHODS FOR DISCOVERING MACHINES

(75) Inventor: Paul Gassoway, Norwood, MA (US)

(73) Assignee: Computer Associates Think, Inc., Islandia, NY (US)

( * ) Notice: Subject to any disclaimer, the term of this patent is extended or adjusted under 35 U.S.C. 154(b) by 912 days.

(21) Appl. No.: 11/134,119

(22) Filed: May 20, 2005

(65) Prior Publication Data

US 2005/0262234 A1    Nov. 24, 2005

Related U.S. Application Data

(60) Provisional application No. 60/573,595, filed on May 21, 2004.

(51) Int. Cl.
| | |
|---|---|
| G01R 31/08 | (2006.01) |
| G06F 11/00 | (2006.01) |
| G08C 15/00 | (2006.01) |
| H04J 1/16 | (2006.01) |
| H04J 3/14 | (2006.01) |
| H04J 3/16 | (2006.01) |
| H04J 3/24 | (2006.01) |
| H04J 3/26 | (2006.01) |
| H04L 1/00 | (2006.01) |
| H04L 12/26 | (2006.01) |
| H04L 12/28 | (2006.01) |
| H04L 12/56 | (2006.01) |
| H04H 20/71 | (2008.01) |
| G06F 15/16 | (2006.01) |
| G06F 15/173 | (2006.01) |
| G06F 9/00 | (2006.01) |
| G06F 17/00 | (2006.01) |

(52) U.S. Cl. ........ 370/249; 370/252; 370/312; 370/346; 370/349; 370/392; 370/395.54; 370/401; 370/432; 709/211; 709/223; 726/12; 726/14

(58) Field of Classification Search ................... 370/395
See application file for complete search history.

(56) References Cited

U.S. PATENT DOCUMENTS

| | | | | |
|---|---|---|---|---|
| 5,570,366 | A | * | 10/1996 | Baker et al. .................. 370/312 |
| 5,727,157 | A | * | 3/1998 | Orr et al. ....................... 709/224 |
| 5,854,901 | A | * | 12/1998 | Cole et al. ..................... 709/245 |
| 6,144,960 | A | * | 11/2000 | Okada et al. ........................ 1/1 |
| 6,148,410 | A | * | 11/2000 | Baskey et al. ................ 714/4.11 |
| 6,151,331 | A | * | 11/2000 | Wilson .......................... 370/465 |
| 6,269,099 | B1 | | 7/2001 | Borella et al. ................. 370/389 |

(Continued)

FOREIGN PATENT DOCUMENTS

| | | |
|---|---|---|
| EP | 0 695 059 A1 | 1/1996 |
| EP | 1 118 952 A2 | 7/2001 |

OTHER PUBLICATIONS

WINS, article published on the internet, WAYBACK Machine date Oct. 12, 2003.*

(Continued)

*Primary Examiner* — Nishant Divecha

(74) *Attorney, Agent, or Firm* — Baker Botts L.L.P.

(57) ABSTRACT

A method for discovering computers connected to a computer network, including receiving a packet containing address information of a computer connected to the computer network that sent the packet, extracting the address information from the packet, and adding the address information to a database of discovered computers connected to the computer network.

54 Claims, 4 Drawing Sheets

U.S. PATENT DOCUMENTS

| | | | | |
|---|---|---|---|---|
| 6,987,743 B2 * | 1/2006 | Chen et al. | ...................... | 370/328 |
| 7,352,726 B2 * | 4/2008 | Fujisawa | ........................ | 370/338 |
| 2003/0039260 A1 | 2/2003 | Fujisawa | ........................ | 370/401 |

OTHER PUBLICATIONS

Notification of Transmittal of the International Search Report for application PCT/US2005/017859 (8 pages), Sep. 21, 2005.

Written Opinion of the International Searching Authority for application PCT/US2005/017859 (6 pages), Sep. 21, 2005.

Secure Link State Routing for Mobile Ad Hoc Networks; Panagiotis Papadimitratos and Zygmunt J. Haas; School of Electrical and Computer Engineering, Cornell University, Ithaca NY 14853; 5 pages.

* cited by examiner

SYSTEMS AND METHODS FOR DISCOVERING MACHINES

REFERENCE TO RELATED APPLICATION

The present disclosure is based on and claims the benefit of Provisional Application Ser. No. 60/573,595 filed May 21, 2004, the entire contents of which are herein incorporated by reference.

BACKGROUND

1. Technical Field

The present disclosure relates to discovering machines and, more specifically, to systems and methods for discovering machines.

2. Description of the Related Art

Computers have become indispensable tools for businesses around the globe. However, computer networks and systems are routinely threatened by a vast number of malicious elements. Among them, malicious programs, such as computer viruses, worms, Trojan horses and the like threaten to inflict costly damage to computers, networks and the valuable data they manage.

Malicious programs are not the only threat that exists. Malicious attacks, such as denial of service attacks, may be launched against a computer network. Like malicious programs, malicious attacks threaten to render expensive computer networks useless.

Computers and computer networks are also threatened by commercial elements, among them, unsolicited commercial email and spyware. Unsolicited commercial email, or spam, can impose a significant burden on limited network resources and employee time.

Spyware, or adware, is a general term for programs that surreptitiously monitor the actions of a computer user. While spyware can sometimes be malicious, for example a remote control program used by a hacker, software companies have been known to use spyware to gather data about customers. In addition to tying up limited resources, spyware can threaten the security of sensitive information.

The use of computers by a business also carries more conventional risks, such as risks associated with the supervision of computer equipment. Computer equipment can be valuable and is often portable thereby creating a risk of theft or loss of equipment.

To combat the various threats to computer networks and systems, a wide variety of tools have been developed. For example, antivirus programs, programs that monitor computer systems for evidence of malicious programs, have proven highly effective against the treat posed by malicious programs. Other examples of countermeasures include firewalls, spam blockers, anti-spyware tools and the like. Additionally, inventory control programs have proven to be a useful method for keeping track of computer equipment.

However these tools can only be effective against the various threats to computer networks and systems when they are properly installed and running on the systems that form networks. For example, before an antivirus program can be effective, it must first be properly installed and running on each computer in the network.

Computer networks are often only as secure as their weakest computer system. For example, a worm infection on a single computer system can potentially bring down an entire computer network. It is therefore of critical importance that network administrators are able to ensure that every computer system on their computer network has the very latest countermeasures.

Systems can be used to ensure that each computer on a computer network has the necessary countermeasures installed and running. However these systems must generally first acquire an accurate list of all computers on the network. On large computer networks, it is often a very difficult task to identify every computer that may be connected to the network.

One way to build a list of all computers on the network is to initiate an Internet Control Message Protocol (ICMP) Packet Internet Groper (PING) sweep (ping sweep). During a ping sweep, an ICMP echo request is sent to every possible internet address that may exist on the various subnets that form the network. If a computer is on the network and receives the ping, the computer generates a return response indicating that it is present. The ping sweep should thereby obtain a list of the internet addresses of every computer on the network at the time the ping sweep was initiated.

The ping sweep has several disadvantages. The ping sweep can require a large amount of network resources and may take a long time to complete. Furthermore, some firewall products prevent a computer from responding to a ping resulting in computers being missed.

Another way to build a list of all computers on the network is to query a database that contains a list of addresses of computers on the computer network. For example, a Windows Internet Naming Service (WINS) database may be queried. A WINS is software which correlates NetBIOS names of computers on a computer network with their internet addresses. NetBIOS names may be given to all Windows computers on a NetBIOS compatible computer network and therefore querying the WINS database may reveal the internet addresses of every Windows compatible computer on the computer network. However, the WINS database generally does not contain the internet addresses of non-Windows compatible computers that may be connected to the computer network.

For example, a Domain Name System (DNS) database may be queried. A DNS is a data query service used to correlate hostnames with internet addresses. A hostname is a unique name given to a computer on a computer network to facilitate electronic communication with that computer. However, DNS databases must be manually maintained by a network administrator and may be incomplete.

SUMMARY

A method for discovering computers connected to a computer network, including receiving a packet containing address information of a computer connected to the computer network that sent the packet, extracting the address information from the packet, and adding the address information to a database of discovered computers connected to the computer network.

A system for discovering computers connected to a computer network, including a receiving unit for receiving a packet containing address information of a computer connected to the computer network that sent the packet, an extracting unit for extracting the address information from the packet, and an adding unit for adding the address information to a database of discovered computers connected to the computer network.

A computer system including a processor, and a program storage device readable by the computer system, including computer executable code executable by the processor for discovering computers connected to a computer network. The computer executable code includes code for receiving a packet containing address information of a computer connected to the computer network that sent the packet, code for extracting the address information from the packet, and code for adding the address information to a database of discovered computers connected to the computer network.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DETAILED DESCRIPTION

Figure 1:
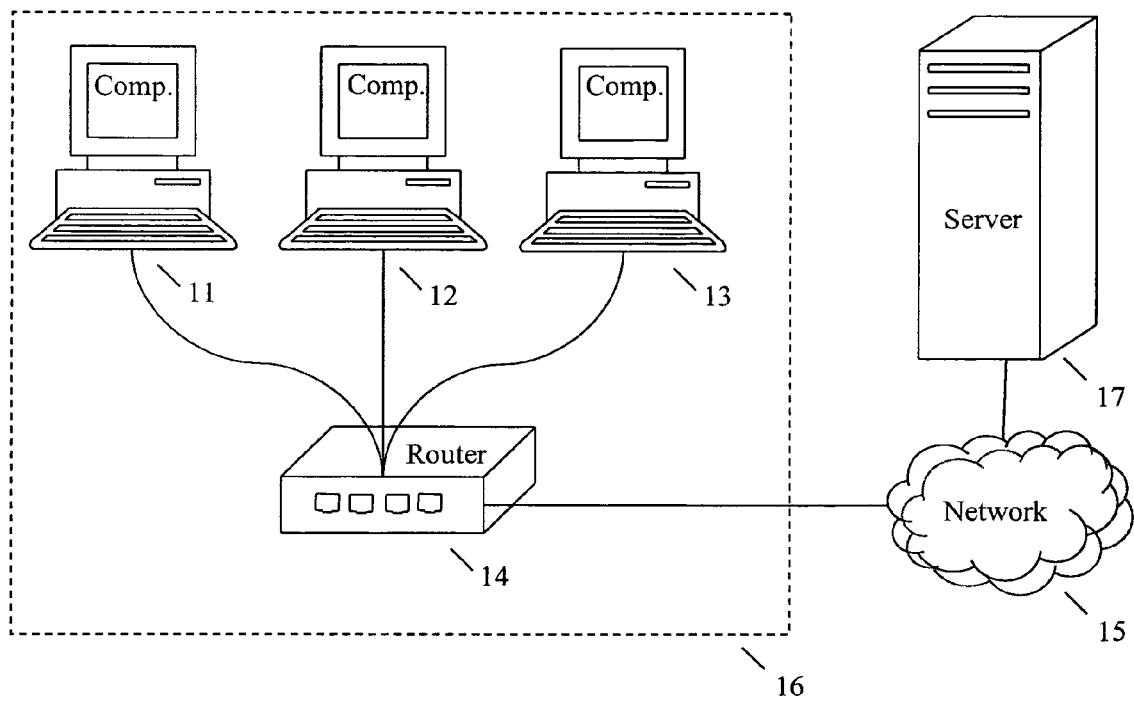
FIG. 1 is a diagram illustrating how ARP can be used to obtain a list of computers on a computer network according to embodiments of the present disclosure.

In describing the preferred embodiments of the present disclosure illustrated in the drawings, specific terminology is employed for sake of clarity. However, the present disclosure is not intended to be limited to the specific terminology so selected, and it is to be understood that each specific element includes all technical equivalents which operate in a similar manner.

Embodiments of the present disclosure seek to utilize Address Resolution Protocol (ARP) to develop and maintain an accurate list of all computers on a computer network so that the computers may all be tested to ensure that the desired security measures are in place.

ARP is a protocol used by computers to help them communicate with other computers on the computer network. A computer may desire to communicate with another computer on the network but may only know its internet address and not its Ethernet address. Because network communication often requires knowledge of Ethernet addresses, ARP helps the computer find the other computer's Ethernet address from its internet address. An Ethernet address (MAC address) is a physical address that identifies an individual Ethernet controller board that a computer uses to connect to the computer network. The computer wishing to communicate with the other computer can broadcast an ARP request packet to all computers within a network subnet. This ARP request packet may contain the internet address and Ethernet address of the sending computer along with the internet address of the receiving (destination) computer. Each computer within the subnet receives the ARP request packet and checks to see if the packet lists its own internet address. If not, the computer will ignore the ARP request packet. If the computer's own internet address is listed, the receiving (destination) computer will send an ARP response packet directly to the sending computer. This response packet may contain the receiving (destination) computer's Ethernet address.

FIG. 1 is a diagram illustrating how ARP can be used to obtain a list of computers on a computer network according to embodiments of the present disclosure. Three computers 11-13 may be connected to each other and to a computer network 15 through a router 14 thereby forming a subnet 16 that includes the three computers 11-13. In the normal course of network operation, ARP request packets will often be transmitted as the computers 11-13 within the subnet 16 initiate communications with one another. Because ARP request packets may be broadcast to every computer 11-13 on the subnet 16, one of the computers 13 on the subnet 16 can be programmed to make a record of all incoming ARP request packets. This record can then be used to obtain a list of all computers on the subnet in the manner disclosed below. The computer 13 programmed to record incoming ARP request packets may be any computer on the subnet 16. Alternatively more than one, for example, multiple computers 11-13 on the subnet 16 may be programmed to record incoming ARP request packets. Where the network 15 has multiple subnets, at least one computer in each subnet may be programmed to record incoming ARP request packets. The computer 13 programmed to record ARP request packets may be specifically utilized for this purpose or may be a general purpose computer that provides other functions.

Figure 2:
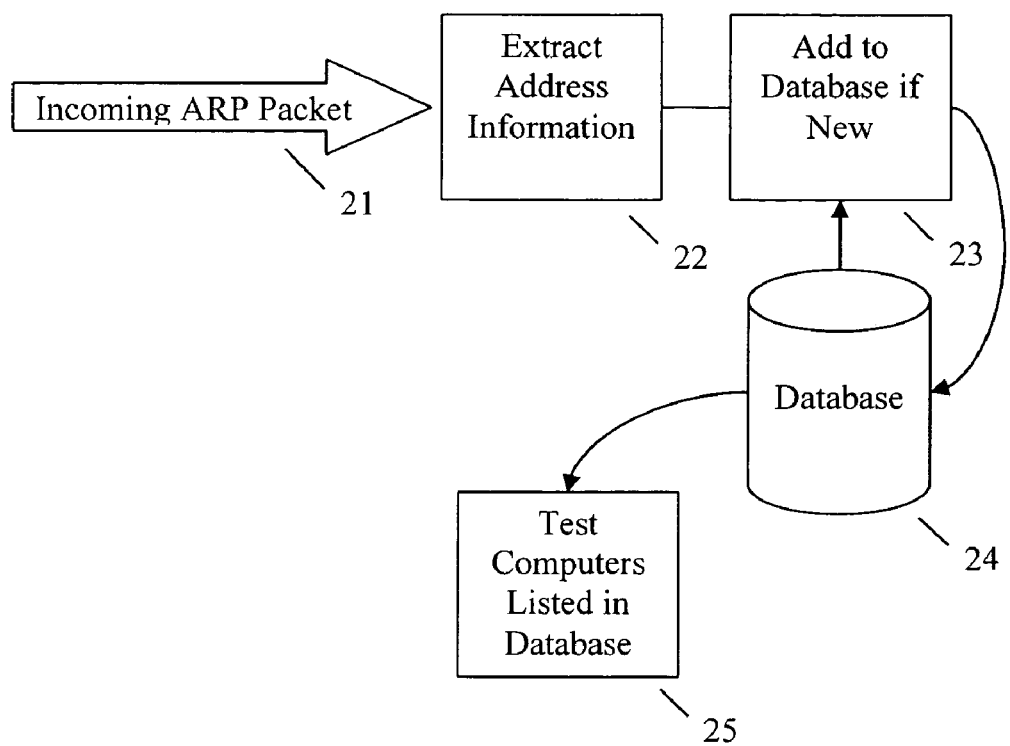
FIG. 2 is a schematic showing how a record of incoming ARP request packets can be used to obtain a list of all computers on a subnet.

FIG. 2 is a schematic showing how a record of incoming ARP request packets can be used to obtain a list of all computers on a subnet. Incoming ARP request packets 21 may be collected by a computer 13 on the subnet 16 that has been programmed to execute an embodiment of the present disclosure (the collecting computer). From these incoming ARP request packets 21, the internet address and Ethernet address of the computer sending the ARP request packet may be extracted 22. Because ARP request packets are broadcast to every computer in the subnet, the collecting computer 13 will receive all ARP request packets sent within the subnet 16. The extracted addresses may then be checked against a database of extracted addresses 24. If the addresses are not present on the database 24 then the addresses may be added 23 to the database 24.

Once a list of all computers in the subnet 16 has been obtained, similar lists from each subnet in the network 15 may be combined to form a list of computers on the network 15. This complete list may be stored, for example, on a server 17 or on one or more of the computers 11-13. The computers listed on the combined list may then be tested to verify that they each have the desired security programs properly installed and running 25. Alternatively, the receiving computer 13 can test to verify that each computer on the subnet 16 has the desired security programs properly installed and running.

There are many methods for checking listed computers to ensure that the desired security programs are properly installed and running. The present disclosure is not limited to any particular method for checking that desired programs are installed. Methods may be specific to the product being checked for. For example, the product being checked for may be programmed to return a specialized return packet when a specialized receive packet is received at the internet address of the computer executing the product. Embodiments of the present disclosure may send the specialized receive packet to each internet address that is listed in the list of computers on the network. Those computers that do not return the specialized return packet may then be assumed to not have the desired security programs properly installed and running. Likewise, those computers that do return the specialized return packet may then be assumed to have the desired security programs properly installed and running.

Where multiple computers 11-13 within the subnet 16 are collecting computers, it may be desirable for these computers to synchronize their lists of computers on the subnet so that the collecting computers will know about the listed computers detected by other collecting computers.

According to some embodiments of the present disclosure, collecting computers within one or more network 15 subnets may all synchronize their respective databases 24 with a centralized database located on a central server 17. The testing of computers listed in the database 24 may then be carried out using the database located on the server 17.

There are multiple methods available for synchronizing databases with the server 17. One available method is the push method. Here, the collecting computer 13 may contact the server 17, for example, when it determines that it has a large enough database 24 of computers on the subnet. Alternatively, the collecting computer may contact the server 17 periodically. Alternatively, the collecting computer 13 may contact the server 17 for an unrelated purpose. When contact is established, the collecting computer can send its database 24 to the server 17. The server may then compare the list of computers on the subnet with its list of computers on the network. Computers that are not already on the server's list of computers on the network may be added to this list.

Another available method is the pull method. Here, the server 17 may decide that the collecting computer 13 should send its database 24 back to the server 17. A request may then be sent from the server 17 directly to the desired collecting computer 13 or a general request may be broadcast over the subnet 16 so that all collecting computers on the subnet 16 can receive the request. Collecting computers 13 receiving the request may then send their databases 24 to the server 17. The server may then compare the list of computers on the subnet with its list of computers on the network. Computers that are not already on the server's list of computers on the network may be added to this list.

There are many possible methods for collecting computers 13 to synchronize databases 24 with one another. For example, each collecting computer 13 can broadcast an entry in its database 24 every so often, for example, every one minute. Other collecting computers would then be able to receive the broadcast and add it to its own database if is not already listed. Another method is for collecting computers 13 to send a copy of their databases to every computer it receives an ARP request packet from. In addition to allowing for the synchronization of databases 24, this method would provide a way to check to see if the collecting computer 13 is actually functioning as a collecting computer.

Old database entries may be deleted after a predetermined length of time, for example, 48 hours. This would allow the databases to remove address entries for computers that are no longer connected to the network. Where such a method is used, synchronization of databases 24 may be limited to passing only those database entries that the collecting computer collected itself. Entries that resulted from a prior synchronization should not be further synchronized as doing so might prevent the removal of database entries for computers that are no longer connected to the network 15.

Using the database of addresses of computers connected to the network, the server 17 may be able acquire additional information about the computers 11-13 connected to the network 15. For example, the collected addresses can be cross referenced with DNS and/or WINS databases to find, where known, the name of the computers connected to the network based on their internet address. NMAP is a utility for network exploration that may be used to determine information such as what operating system a computer is running based on an examination of packets that the computer transmits. NMAP may be used to determine additional information about computers that are connected to the network 15.

Figure 3:
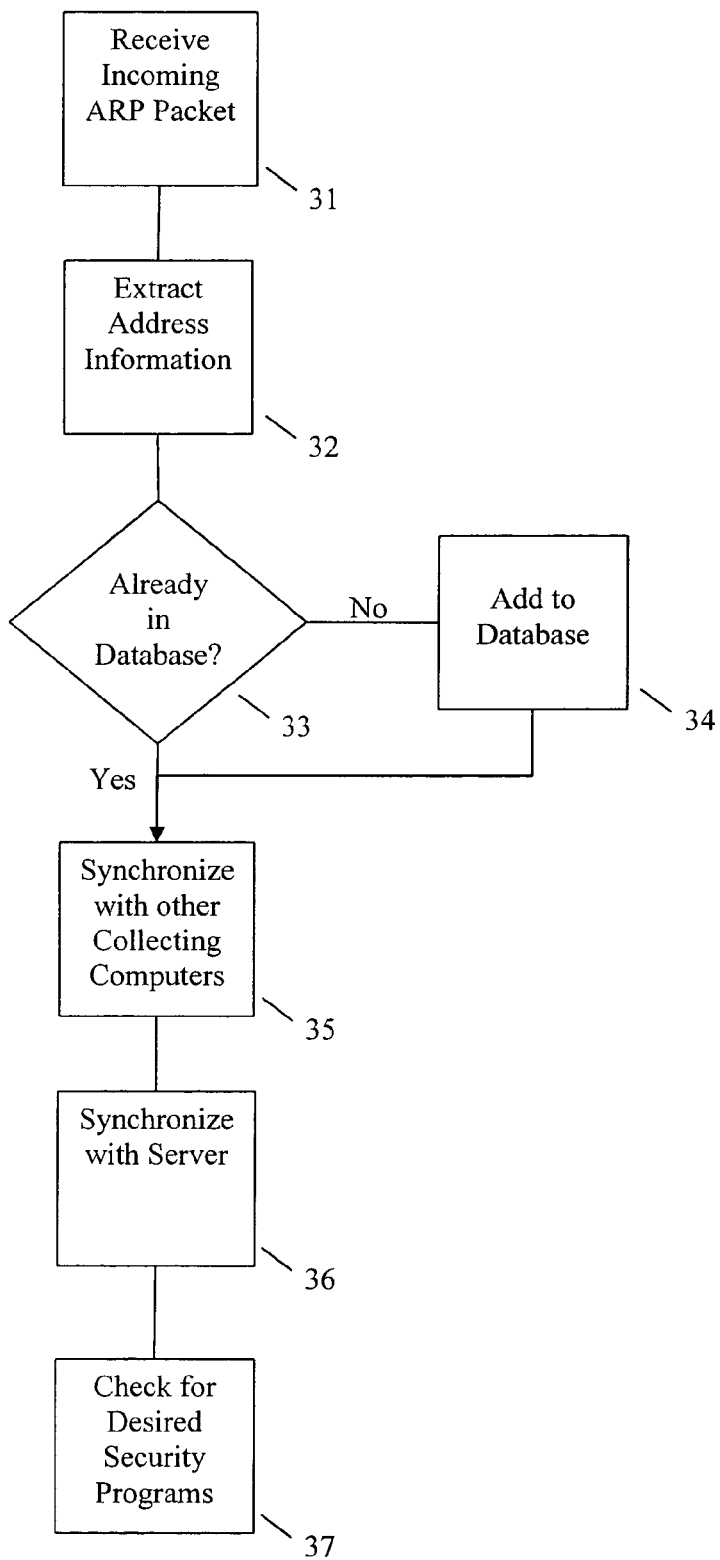
FIG. 3 is a flowchart illustrating an embodiment of the present disclosure.

FIG. 3 is a flowchart illustrating an embodiment of the present disclosure. The collecting computer 13 receives requested ARP packets from other computers 11-12 in the subnet 16 (Step S31). Address information such as, for example, an internet address and an Ethernet address may be extracted from the received requested ARP packet (Step S32). The collecting computer may then check its database 24 to determine if the address information extracted from the received requested ARP packet is already listed in the database 24 (Step S33). If it is not (No Step S33) then the address information may be added to the database 24 (Step S34). If the address information is already in the database (Yes Step S33) then the address need not be added to the database.

Where there is more than one collecting computer 13 within the subnet 16, the databases 24 of the collecting computers 13 may be synchronized with one another (Step S35). Where there is more than one subnet 16 on the computer network 15, it may also be desirable to synchronize the databases 24 of the collecting computers 13 from other subnets 15 with one another. Where there is a centralized server 17, a database may be maintained on that server 17 and the databases 24 of the collecting computers 13 may be synchronized with the database on the server 17. The server may then check the computers listed in the server's database to see if the desired security programs are installed and running (Step S37). Alternatively, one or more of the collecting computers 13 may check the computers listed in the server's database to see if the desired security programs are installed and running.

Figure 4:
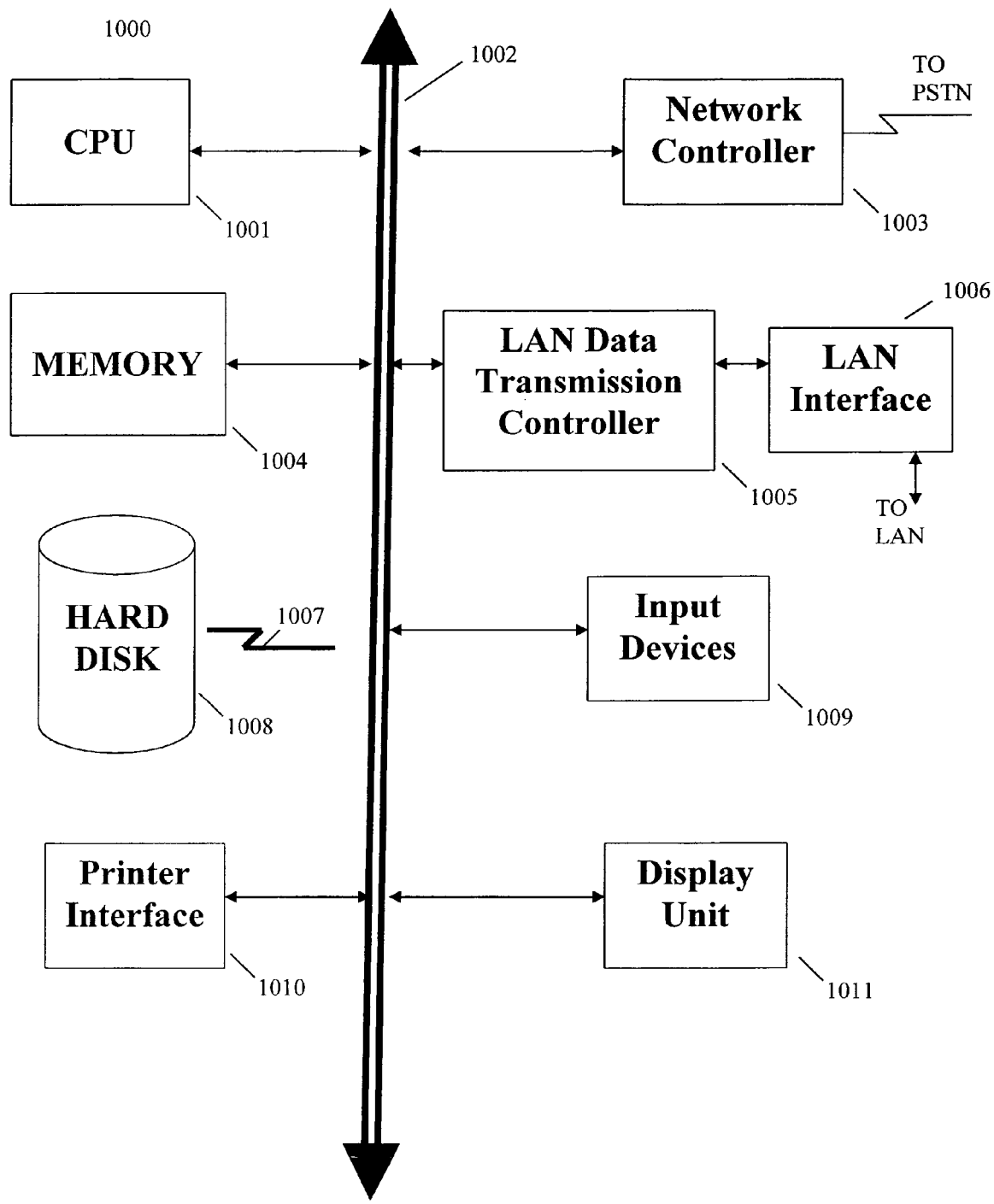
FIG. 4 shows an example of a computer system capable of implementing the method and apparatus according to embodiments of the present disclosure.

FIG. 4 shows an example of a computer system which may implement the method and system of the present disclosure. The system and method of the present disclosure may be implemented in the form of a software application running on a computer system, for example, a mainframe, personal computer (PC), handheld computer, server, etc. The software application may be stored on a recording media locally accessible by the computer system and accessible via a hard wired or wireless connection to a network, for example, a local area network, or the Internet.

The computer system referred to generally as system 1000 may include, for example, a central processing unit (CPU) 1001, random access memory (RAM) 1004, a printer interface 1010, a display unit 1011, a local area network (LAN) data transmission controller 1005, a LAN interface 1006, a network controller 1003, an internal buss 1002, and one or more input devices 1009, for example, a keyboard, mouse etc. As shown, the system 1000 may be connected to a data storage device, for example, a hard disk, 1008 via a link 1007.

The above specific embodiments are illustrative, and many variations can be introduced on these embodiments without departing from the spirit of the disclosure or from the scope of the appended claims. For example, elements and/or features of different illustrative embodiments may be combined with each other and/or substituted for each other within the scope of this disclosure and appended claims.

What is claimed is:

1. A method, comprising:
   for each of one or more computers connected to a first computer in a computer network:
   receiving a packet containing internet and ethernet address information of one of the one or more computers;
   extracting the internet and ethernet address information from the packet;
   adding the internet and ethernet address information to a database of discovered computers connected to the computer network; and associating the internet address information with the ethernet address information in the database of discovered computers;

synchronizing the database of discovered computers with other databases of discovered computers connected to the computer network by:

adding, to the database of discovered computers, additional internet and ethernet address information stored in the other databases of discovered computers, wherein the adding the additional internet and ethernet address information is based on one or more communications between the first computer including the database of discovered computers and one or more other computers including the other databases of discovered computers, and wherein the adding the additional internet and ethernet address information does not cause the additional internet and ethernet address information to be removed from the other databases of discovered computers; and communicating the internet and ethernet address information for the one or more computers to the other databases of discovered computers; and conducting an additional synchronization of the database of discovered computers with the other databases of discovered computers, wherein the additional synchronization includes communicating only the internet and ethernet address information for the one or more computers to the other databases of discovered computers, wherein communicating only the internet and ethernet address information for the one or more computers to the other databases of discovered computers prevents the additional internet and ethernet address information stored in the database of discovered computers from being communicated to the other databases of discovered computers.

2. The method of claim 1, wherein the packet is an Address Resolution Protocol (ARP) request packet.

3. The method of claim 1, wherein adding the internet and ethernet address information to the database of discovered computers connected to the computer network comprises:

checking the database of discovered computers connected to the computer network to determine if the internet and ethernet address information is already included in the database of discovered computers connected to the computer network; and adding the internet and ethernet address information to the database of discovered computers connected to the computer network when it has been determined that the internet and ethernet address information is not already included in the database of discovered computers connected to the computer network.

4. The method of claim 1, wherein the computer network is a subnet of a greater computer network and the packet is broadcast to every computer within the subnet.

5. The method of claim 1, wherein the database of discovered computers connected to the computer network is synchronized with a central database of discovered computers located on a server connected to the computer network.

6. The method of claim 5, wherein the database of discovered computers connected to the computer network is synchronized with a central database of discovered computers located on a server connected to the computer network when the database of discovered computers connected to the computer network is pushed to the server.

7. The method of claim 5, wherein the database of discovered computers connected to the computer network is synchronized with a central database of discovered computers located on a server connected to the computer network when the database of discovered computers connected to the computer network is pulled by the server.

8. The method of claim 1 further comprising: deleting the internet and ethernet address information from the database of discovered computers connected to the computer network after a predetermined length of time.

9. The method of claim 1 further comprising: obtaining information about the discovered computers connected to the computer network by cross referencing the internet and ethernet address information with a database containing information about computers connected to the computer network.

10. The method of claim 9 wherein the database is a WINDOWS INTERNET NAMING SERVICE (WINS) database.

11. The method of claim 9 wherein the database is a DOMAIN NAME SYSTEM (DNS) database.

12. The method of claim 1, further comprising checking each computer at each address within the database of discovered computers connected to the computer network to see if at least one particular computer program is present.

13. The method of claim 12, wherein said at least one particular computer program provides for the security of the computers connected to the computer network.

14. The method of claim 13, wherein said at least one particular computer program is an antivirus program.

15. The method of claim 13, wherein said at least one particular computer program is an anti-spyware tool.

16. The method of claim 13, wherein said at least one particular computer program is an inventory control program.

17. The method of claim 1, further comprising:

sending a specialized receive packet to a particular computer connected to the computer network using a particular address within the database of discovered computers, wherein the specialized receive packet is designed to cause a particular software program on the particular computer to respond with a specialized return packet indicating that the particular software program is present on the particular computer; and receiving from the particular software program the specialized return packet if the particular software program is present.

18. A system, comprising:

a processor; and computer-executable program code executable by the processor, the computer-executable program code comprising:

a receiving unit, executable by the processor, for receiving, for each of one or more computers connected to a first computer in a computer network, a packet containing internet and ethernet address information of one of the one or more computers;

an extracting unit, executable by the processor, for extracting, for each of the one or more computers, the internet and ethernet address information from the packet; and an adding unit, executable by the processor, for adding, for each of the one or more computers, the internet and ethernet address information to a database of discovered computers connected to the computer network and associating the internet address information with the ethernet address information in the database of discovered computers; and a synchronizing unit, executable by the processor, for synchronizing the database of discovered computers with other databases of discovered computers connected to the computer network by:

adding, to the database of discovered computers, additional internet and ethernet address information stored in the other databases of discovered computers, wherein the adding the additional internet and ethernet address information is based on one or more communications between the first computer including the database of discovered computers and one or more other computers including the other databases of discovered computers, and wherein the adding the additional internet and ethernet address information does not cause the additional internet and ethernet address information to be removed from the other databases of discovered computers; and communicating the internet and ethernet address information for the one or more computers to the other databases of discovered computers;

wherein the synchronizing unit for synchronizing the database of discovered computers with the other databases of discovered computers comprises an additional synchronizing unit for conducting an additional synchronization of the database of discovered computers with the other databases of discovered computers, wherein the additional synchronization includes communicating only the internet and ethernet address information for the one or more computers to the other databases of discovered computers, wherein communicating only the internet and ethernet address information for the one or more computers to the other databases of discovered computers prevents the additional internet and ethernet address information stored in the database of discovered computers from being communicated to the other databases of discovered computers.

19. The system of claim 18, wherein the packet is an ARP request packet.

20. The system of claim 18, wherein the adding unit for adding the internet and ethernet address information to the database of discovered computers connected to the computer network comprises:

a checking unit for checking the database of discovered computers connected to the computer network to determine if the internet and ethernet address information is already included in the database of discovered computers connected to the computer network; and a unit for adding the internet and ethernet address information to the database of discovered computers connected to the computer network when it has been determined that the internet and ethernet address information is not already included in the database of discovered computers connected to the computer network.

21. The system of claim 18, wherein the computer network is a subnet of a greater computer network and the packet is broadcast to every computer within the subnet.

22. The system of claim 18, wherein the database of discovered computers connected to the computer network is synchronized with a central database of discovered computers located on a server connected to the computer network.

23. The system of claim 22, wherein the database of discovered computers connected to the computer network is synchronized with a central database of discovered computers located on a server connected to the computer network when the database of discovered computers connected to the computer network is pushed to the server.

24. The system of claim 22, wherein the database of discovered computers connected to the computer network is synchronized with a central database of discovered computers located on a server connected to the computer network when the database of discovered computers connected to the computer network is pulled by the server.

25. The system of claim 18, wherein the computer-executable program code further comprises: a deleting unit for deleting the internet and ethernet address information from the database of discovered computers connected to the computer network after a predetermined length of time.

26. The system of claim 18, wherein the computer-executable program code further comprises: an obtaining unit for obtaining information about the discovered computers connected to the computer network by cross referencing the internet and ethernet address information with a database containing information about computers connected to the computer network.

27. The system of claim 26 wherein the database is a WINDOWS INTERNET NAMING SERVICE (WINS) database.

28. The system of claim 26 wherein the database is a DOMAIN NAME SYSTEM (DNS) database.

29. The system of claim 18, wherein the computer-executable program code further comprises: a checking unit for checking each computer at each address within the database of discovered computers connected to the computer network to see if at least one particular computer program is present.

30. The system of claim 29, wherein said at least one particular computer program provides for the security of the computers connected to the computer network.

31. The system of claim 30, wherein said at least one particular computer program is an antivirus program.

32. The system of claim 30, wherein said at least one particular computer program is an anti-spyware tool.

33. The system of claim 30, wherein said at least one particular computer program is an inventory control program.

34. The system of claim 18, wherein the receiving unit is further operable to:

send a specialized receive packet to a particular computer connected to the computer network using a particular address within the database of discovered computers, wherein the specialized receive packet is designed to cause a particular software program on the particular computer to respond with a specialized return packet indicating that the particular software program is present on the particular computer; and receive the specialized return packet from the particular software program if the particular software program is present.

35. A computer system comprising: a processor; and a program storage device readable by the computer system, including computer executable code executable by the processor, the computer executable code comprising:

for each of one or more computers connected to a first computer in a computer network:

code for receiving a packet containing internet and ethernet address information of one of the one or more computers;

code for extracting the internet and ethernet address information from the packet;

code for adding the internet and ethernet address information to a database of discovered computers connected to the computer network; and code for associating the internet address information with the ethernet address information in the database of discovered computers;

code for synchronizing the database of discovered computers with other databases of discovered computers connected to the computer network by: adding, to the database of discovered computers, additional internet and ethernet address information stored in the other databases of discovered computers, wherein the adding the additional internet and ethernet address information is based on one or more communications between the first computer including the database of discovered computers and one or more other computers including the other databases of discovered computers, and wherein the adding the additional internet and ethernet address information does not cause the additional internet and ethernet address information to be removed from the other databases of discovered computers; and communicating the internet and ethernet address information for the one or more computers to the other databases of discovered computers; and code for conducting an additional synchronization of the database of discovered computers with the other databases of discovered computers, wherein the additional synchronization includes communicating only the internet and ethernet address information for the one or more computers to the other databases of discovered computers, wherein communicating only the internet and ethernet address information for the one or more computers to the other databases of discovered computers prevents the additional internet and ethernet address information stored in the database of discovered computers from being communicated to the other databases of discovered computers.

36. The computer system of claim 35, wherein the packet is an ARP request packet.

37. The computer system of claim 35, wherein the code for adding the internet and ethernet address information to the database of discovered computers connected to the computer network comprises:

code for checking the database of discovered computers connected to the computer network to determine if the internet and ethernet address information is already included in the database of discovered computers connected to the computer network; and code for adding the internet and ethernet address information to the database of discovered computers connected to the computer network when it has been determined that the internet and ethernet address information is not already included in the database of discovered computers connected to the computer network.

38. The computer system of claim 35, wherein the computer network is a subnet of a greater computer network and the packet is broadcast to every computer within the subnet.

39. The computer system of claim 35, wherein the database of discovered computers connected to the computer network is synchronized with a central database of discovered computers located on a server connected to the computer network.

40. The computer system of claim 39, wherein the database of discovered computers connected to the computer network is synchronized with a central database of discovered computers located on a server connected to the computer network when the database of discovered computers connected to the computer network is pushed to the server.

41. The computer system of claim 39, wherein the database of discovered computers connected to the computer network is synchronized with a central database of discovered computers located on a server connected to the computer network when the database of discovered computers connected to the computer network is pulled by the server.

42. The computer system of claim 35 further comprising: code for deleting the internet and ethernet address information from the database of discovered computers connected to the computer network after a predetermined length of time.

43. The computer system of claim 35 further comprising: code for obtaining information about the discovered computers connected to the computer network by cross referencing the internet and ethernet address information with a database containing information about computers connected to the computer network.

44. The computer system of claim 43 wherein the database is a WINDOWS INTERNET NAMING SERVICE (WINS) database.

45. The computer system of claim 43 wherein the database is a DOMAIN NAME SYSTEM (DNS) database.

46. The computer system of claim 35, further comprising code for checking each computer at each address within the database of discovered computers connected to the computer network to see if at least one particular computer program is present.

47. The computer system of claim 46, wherein said at least one particular computer program provides for the security of the computers connected to the computer network.

48. The computer system of claim 47, wherein said at least one particular computer program is an antivirus program.

49. The computer system of claim 47, wherein said at least one particular computer program is an anti-spyware tool.

50. The computer system of claim 47, wherein said at least one particular computer program is an inventory control program.

51. The computer system of claim 35, further comprising: code for sending a specialized receive packet to a particular computer connected to the computer network using a particular address within the database of discovered computers, wherein the specialized receive packet is designed to cause a particular software program on the particular computer to respond with a specialized return packet indicating that the particular software program is present on the particular computer; and code for receiving the specialized return packet from the particular software program if the particular software program is present.

52. A non-transitory computer readable storage medium including computer executable code comprising:

for each of one or more computers connected to a first computer in a computer network:

code for receiving a packet containing internet and ethernet address information of one of the one or more computers;

code for extracting the internet and ethernet address information from the packet;

code for adding the address information to a database of discovered computers connected to the computer network; and code for and associating the internet address information with the ethernet address information in the database of discovered computers;

code for synchronizing the database of discovered computers with other databases of discovered computers connected to the computer network by:

adding, to the database of discovered computers, additional internet and ethernet address information stored in the other databases of discovered computers, wherein the adding the additional internet and ethernet address information is based on one or more communications between the first computer including the database of discovered computers and one or more other computers including the other databases of discovered computers, and wherein the adding the additional internet and ethernet address information does not cause the additional internet and ethernet address information to be removed from the other databases of discovered computers; and communicating the internet and ethernet address information for the one or more computers to the other databases of discovered computers; and code for conducting an additional synchronization of the database of discovered computers with the other databases of discovered computers, wherein the additional synchronization includes communicating only the internet and ethernet address information for the one or more computers to the other databases of discovered computers, wherein communicating only the internet and ethernet address information for the one or more computers to the other databases of discovered computers prevents the additional internet and ethernet address information stored in the database of discovered computers from being communicated to the other databases of discovered computers.

53. The non-transitory computer readable storage medium of claim 52, further comprising: code for checking each computer at each address within the database of discovered computers connected to the computer network to see if at least one particular computer program is present.

54. The non-transitory computer readable storage medium of claim 52, further comprising:

code for sending a specialized receive packet to a particular computer connected to the computer network using a particular address within the database of discovered computers, wherein the specialized receive packet is designed to cause a particular software program on the particular computer to respond with a specialized return packet indicating that the particular software program is present on the particular computer; and code for receiving the specialized return packet from the particular software program if the particular software program is present.

\* \* \* \* \*